United States Patent [19]
Summerfelt et al.

[11] Patent Number: 5,888,659
[45] Date of Patent: Mar. 30, 1999

[54] DONOR DOPED PEROVSKITES FOR THIN-FILM FERROELECTRIC AND PYROELECTRIC DEVICES

[75] Inventors: Scott R. Summerfelt, Dallas; Howard R. Beratan, Richardson, both of Tex.; Bernard M. Kulwicki, N. Attleboro, Mass.

[73] Assignee: Texas Instruments Incorporated, Dallas, Tex.

[21] Appl. No.: 477,722

[22] Filed: Jun. 7, 1995

Related U.S. Application Data

[62] Division of Ser. No. 331,252, Oct. 28, 1994, abandoned, which is a continuation of Ser. No. 156,522, Nov. 22, 1993, abandoned, which is a continuation of Ser. No. 951,596, Sep. 28, 1993, abandoned.

[51] Int. Cl.$^6$ ..................................................... B32B 17/00
[52] U.S. Cl. ........................ 428/469; 428/472; 428/689; 428/697; 428/701; 428/702
[58] Field of Search ..................................... 428/469, 471, 428/472, 688, 689, 697, 702, 701; 106/286.1, 286.2, 286.3, 286.4, 286.5, 286.6; 252/518, 519, 520, 521; 250/338.2, 338.3; 501/134, 135, 136, 137, 138, 139

[56] References Cited

U.S. PATENT DOCUMENTS

| | | | |
|---|---|---|---|
| 3,975,307 | 8/1976 | Matsuo | 252/520 |
| 3,996,168 | 12/1976 | Hoffmann | 252/520 |
| 4,024,081 | 5/1977 | Ohmori et al. | 252/62.9 |
| 4,059,537 | 11/1977 | Espinosa | 252/62.9 |
| 4,101,454 | 7/1978 | Kulwicki | 252/521 |
| 5,130,281 | 7/1992 | Sano et al. | 501/138 |
| 5,202,814 | 4/1993 | Kohno et al. | 361/321 |
| 5,268,006 | 12/1993 | Ueno | 29/25.03 |
| 5,314,651 | 5/1994 | Kulwicki | 264/65 |
| 5,453,262 | 9/1995 | Dawson | 423/593 |

OTHER PUBLICATIONS

Wang, et al. "The Effect of Dysprosium On The Microstructure and Dielectric Properties of $(Ba_{1-x}Sr_x)TiO_3$" ISAF Proceedings, pp. 55–58, '92.

Kumar et al. "Grain Size Effect on the Dielectric Properties of Strontium Barium Titanate", ISAF Proceedings, pp 55–58, '92.

Dy–Doped $BaTiO_3$ Ceramics for High Voltage Capacitor Use, Murakami, et al. Ceramic Bulletin 55[6], pp 572–575, '76.

A Modified Barium, Titanate for Capacitors, U. Syamaprasad, et al. J. Am Ceramic Soc. 70[7], C–147 C–148 (1987.

Ceramic Materials for Electronics, I. Buchanan, II Series.

Dependence of the Crystal Structure on Particle Size in Barium Titanate, Kenji Uchino, et al., Communications of the American Ceramic, Aug. 1989, 1555–1558.

Primary Examiner—Timothy Speer
Attorney, Agent, or Firm—James E. Harris; Richard A. Stoltz; Richard L. Donaldson

[57] ABSTRACT

The invention forms improved ferroelectric (or pyroelectric) material by doping an intrinsic perovskite material having an intrinsic ferroelectric (or pyroelectric) critical grain size with one or more donor dopants, then forming a layer of the donor doped perovskite material having an average grain size less than the intrinsic ferroelectric (or pyroelectric) critical gran size whereby the remanent polarization (or pyroelectric figure of merit) of the layer is substantially greater than the remanent polarization (or pyroelectric figure of merit) of the intrinsic perovskite material with an average grain size similar to the average grain size of the layer. The critical ferroelectric (or pyroelectric) grain size, as used herein, means the largest grain size such that the remanent polarization (or pyroelectric figure of merit) starts to rapidly decrease with decreasing grain sizes. Preferably, the donor doped perovskite material is further doped with one or more acceptor dopants to form a donor acceptor doped perovskite material whereby the resistivity is substantially increased. Preferably, the intrinsic perovskite material has a chemical composition $AB0_3$, where A is one or more monovalent, divalent or trivalent elements, and B is one or more pentavalent, tetravalent, trivalent or divalent elements. Structures containing an improved ferroelectric (or pyroelectric) material include a layer of donor doped perovskite material with average grain size less than the intrinsic ferroelectric (or pyroelectric) critical grain size formed on the surface of a substrate. Other structures include such a layer of donor doped material interposed between two electrically conducting layers.

9 Claims, 2 Drawing Sheets

DONOR DOPED PEROVSKITES FOR THIN-FILM FERROELECTRIC AND PYROELECTRIC DEVICES

This is a division of application Ser. No. 08/331,252, filed Oct. 28, 1994, now abandoned, which is a continuation of Ser. No. 08/156,552, filed Nov. 22, 1993, now abandone, which is a continuation of Ser. No. 07/951,596, filed Sep. 28, 1993 now abandoned.

FIELD OF THE INVENTION

This invention generally relates to the fabrication of thin film ferroelectric materials such as those used in non-volatile memory devices.

BACKGROUND OF THE INVENTION

Without limiting the scope of the invention, its background is described in connection with applications of thin-film ferroelectric and pyroelectric materials.

The class of materials known as the perovskites exhibit several properties which make them useful in the microelectronics industry. Among these properties is a dielectric constant which can be several orders of magnitude greater than that of conventional insulators used in integrated circuits (e.g. $SiO_2$ and $Si_3N_4$). This high dielectric constant can allow fabrication of very small capacitors which store charge in conventional DRAMs (dynamic random access memories), thereby increasing the density of memory cells.

Related to the dielectric constant is the pyroelectric figure of merit (pyroelectric FOM). The pyroelectric FOM is proportional to the ratio between the pyroelectric coefficient and dielectric constant. The pyroelectric coefficient is a function of the dielectric constant and the spontaneous polarization. Many perovskites exhibit a very large pyroelectric FOM, and if sufficiently large this pyroelectric property makes possible devices which are very sensitive to changes in temperature, including temperature changes caused by impinging electromagnetic radiation. Arrays of such pyroelectric detectors are now being fabricated which can image an infrared scene. These detectors do not require cryogenic cooling and are therefore economically feasible for consumer applications.

The ferroelectric properties of perovskite materials are also useful in the microelectronics industry. Among those properties is the remanent polarization. The direction of this polarization may be switched by the application of an electric field to the material. The polarization remains after the electric field is removed. The direction of this polarization may then be sensed electronically. The remanent polarization of these materials suggests that FRAMs (ferroelectric random access memories) could be constructed which would be non-volatile, i.e. the state (logic one or zero) of each memory element would be retained even if power is removed. Such devices, depending on the configuration, could in addition exhibit faster read/write cycles than conventional DRAMs.

SUMMARY OF THE INVENTION

This invention is a method of forming thin-film perovskite structures which exhibit useful ferroelectric and pyroelectric properties. The perovskite materials are (1) any material exhibiting the well known perovskite crystal structure, typified by $CaTiO_3$; and (2) compounds with structures which can be derived from the ideal cubic perovskite structure by way of small lattice distortions or omission of some atoms. Many perovskites have the chemical formula $ABO_3$, where A is one or more monovalent, divalent or trivalent elements and B is one or more pentavalent, tetravalent, trivalent or divalent elements.

To be useful in the fabrication of integrated circuit FRAMs, perovskite materials must exhibit large remanent polarization and small coercive voltage. To be useful in the fabrication of thin-film pyroelectric devices, perovskite materials must exhibit a large pyroelectric FOM. These properties should be present in thin-films of these materials.

It has been discovered that the ferroelectric and pyroelectric properties of perovskite materials generally decrease as the grain size of the material is decreased. Bulk ceramic forms of perovskites generally have grain sizes on the order of 0.5–100 micrometers ($\mu$m), whereas typical thin-films have grain sizes of 0.02–0.5 $\mu$m. As will be discussed further, the useful properties are essentially absent for grain sizes below a critical grain size which is unique for each material and property. The precise composition of perovskites also affects their ferroelectric and pyroelectric properties.

Much of the past research in this area has endeavored to preserve the ferroelectric and pyroelectric properties of perovskites in thin film form. It is known that depositing thin films in a way that maximizes the grain size serves to maximize these properties. This can be done by keeping the temperature of the substrate onto which the perovskite film is deposited at a high temperature, because higher deposition temperatures usually produce larger grain sizes in the deposited film. Higher substrate temperatures, however, may cause damage to existing devices and structures already formed on the substrate. Generally, temperatures should be kept as low as possible. In addition, the grain size generally is no larger than the film thickness. Current methods of depositing thin film perovskites with good ferroelectric and pyroelectric properties are thus limited by the film thickness and the potential damage caused by elevating the substrate to high temperatures.

Changing the composition of perovskites is another technique which has been used to preserve ferroelectric and pyroelectric properties in thin films. The ferroelectric properties of some lead containing perovskites, for example, do not decrease as rapidly with decreasing grain size. However, PbO is very reactive with many materials, is easily chemically reduced, has a large vapor pressure and readily poisons silicon devices. For these reasons such materials are probably inappropriate candidates for use in the fabrication of integrated circuits.

Generally, this invention overcomes the tradeoffs inherent in prior art techniques by doping the material in a way that decreases the grain size at which ferroelectric and/or pyroelectric properties abate. In one embodiment of the invention, the ferroelectric properties (i.e. remanent polarization) of thin film perovskite materials are enhanced by doping. The embodiment described is a method of forming an improved ferroelectric material by doping an intrinsic perovskite material having an intrinsic ferroelectric critical grain size with one or more donor dopants, then forming a layer of the donor doped perovskite material having an average grain size less than the intrinsic ferroelectric critical grain size whereby the remanent polarization of the layer is substantially greater than the remanent polarization of the intrinsic perovskite material with an average grain size similar to the average grain size of the layer. The ferroelectric critical grain size, as used herein, means the largest grain size such that the remanent polarization starts to rapidly decrease with decreasing grain sizes. Preferably, the donor doped perovskite material is further doped with one or more acceptor dopants to form a donor-acceptor doped perovskite material whereby the resistivity is substantially increased. Preferably, the intrinsic perovskite material has a chemical composition $ABO_3$, where A is one or more monovalent, divalent or trivalent elements, and B is one or more pentavalent, tetravalent, trivalent or divalent elements.

In another embodiment of the invention, the pyroelectric properties (i.e. pyroelectric FOM) of thin film perovskite materials are enhanced by doping. The invention described is a method of forming an improved pyroelectric material by doping an intrinsic perovskite material having an intrinsic pyroelectric critical grain size with one or more donor dopants, then forming a layer of the donor doped perovskite material having an average grain size less than the intrinsic pyroelectric critical grain size whereby the pyroelectric FOM of the layer is substantially greater than the pyroelectric FOM of the intrinsic perovskite material with an average grain size similar to the average grain size of the layer. The pyroelectric critical grain size, as used herein, means the largest grain size such that the pyroelectric FOM starts to rapidly decrease with decreasing grain sizes. Preferably, the donor doped perovskite material is further doped with one or more acceptor dopants to form a donor-acceptor doped perovskite material whereby the resistivity is substantially increased. Preferably, the intrinsic perovskite material has a chemical composition $ABO_3$, where A is one or more monovalent, divalent or trivalent elements, and B is one or more pentavalent, tetravalent, trivalent or divalent elements.

Structures containing these improved ferroelectric and pyroelectric materials include a layer of donor doped perovskite material with average grain size less than the intrinsic ferroelectric or pyroelectric critical grain size formed on the surface of a substrate. Other structures include such a layer of donor doped material interposed between two electrically conducting layers.

The applications of this invention are many. The materials presented may find use in many structures used in semiconductor circuitry, such as capacitors, transistors, non-volatile memory cells, pixels for electro-magnetic radiation detecting arrays, and other electrooptic applications. Devices which exploit the piezoelectric properties of many of these materials will benefit from this invention.

The advantages of this invention include substantially increased remanent polarization for perovskite materials formed with grain sizes typically found in thin films. This invention also serves to preserve the pyroelectric FOM in thin films of perovskite materials. In addition, the resistivity is generally increased by the methods presented.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings.

In the drawings.

DETAILED DESCRIPTION OF THE PREFERRED EMBODIMENTS

Figure 1:
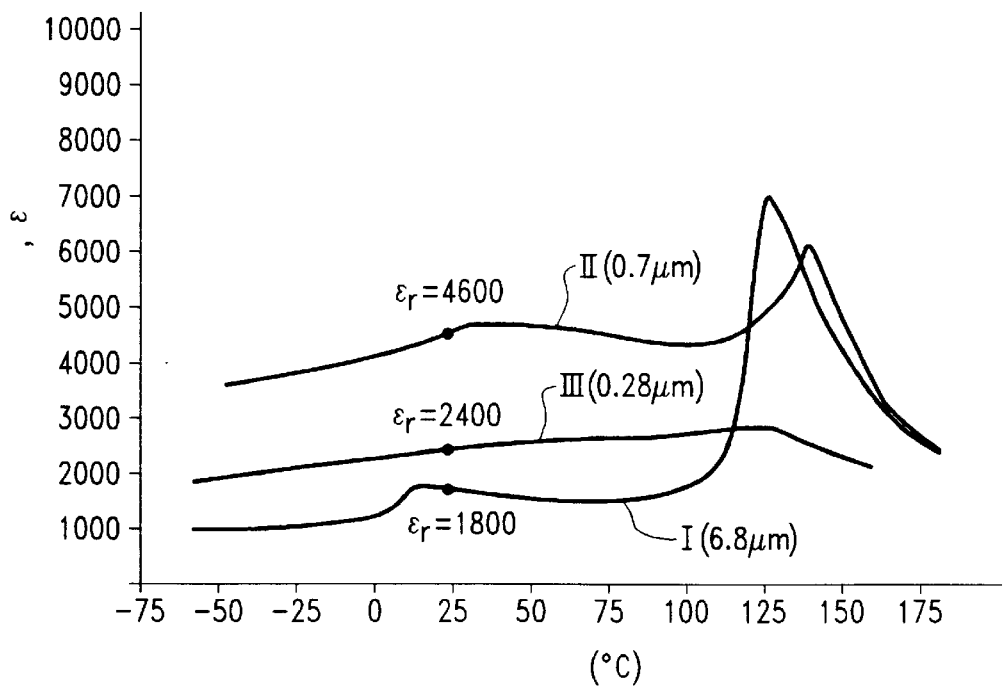
FIG. 1 is a graph showing the variation of dielectric constant versus temperature for undoped barium titanate of various grain sizes.

The useful ferroelectric and pyroelectric properties of a perovskite material generally decrease as the grain size of the material is decreased. As shown in FIG. 1, the dielectric constant of undoped barium titanate (BT) varies with temperature and grain size. For a grain size of 6.8 $\mu$m, the dielectric constant varies rapidly near the Curie temperature (approximately 130° C.), but is less variable at other temperatures. As the grain size is decreased to 0.7 $\mu$m, the peak becomes less pronounced, the dielectric constant below the Curie temperature increases and varies less with temperature. At still smaller grain sizes, the dielectric constant decreases for all temperatures and is essentially constant with respect to temperature.

Figure 2:
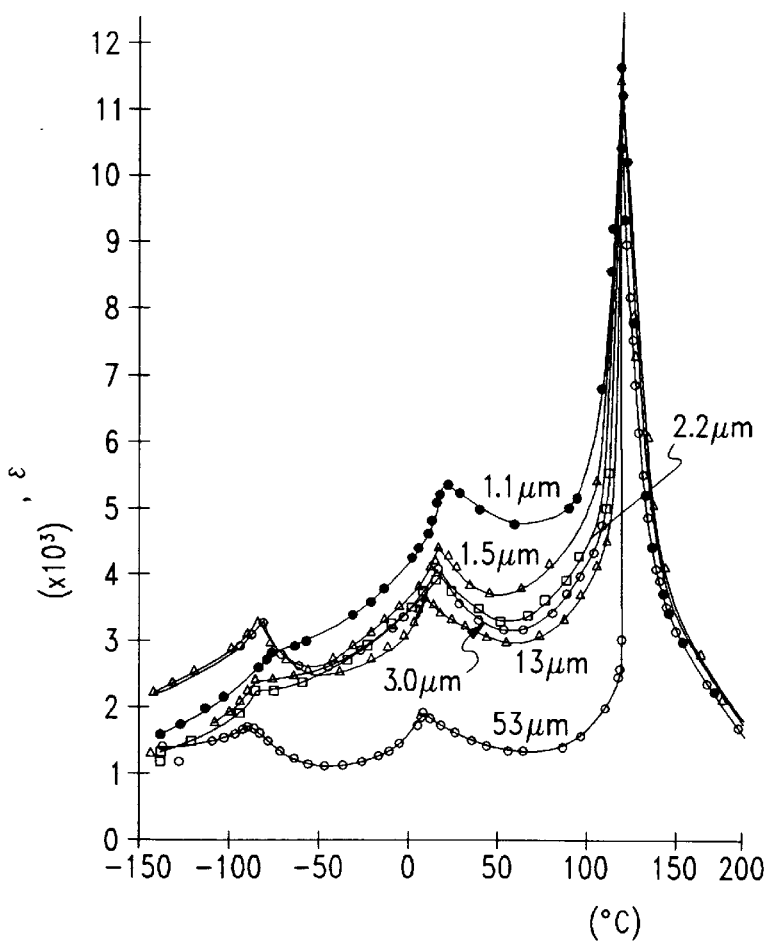
FIG. 2 is a graph showing the variation of dielectric constant versus temperature for undoped barium titanate of various grain sizes.

Referring to FIG. 2, the same trend can be seen. At large grain sizes (i.e. 53 $\mu$m), the dielectric constant has a pronounced peak at the Curie temperature. As the grain size decreases, the dielectric constant below the Curie temperature increases and the peak is less pronounced.

Figure 3:
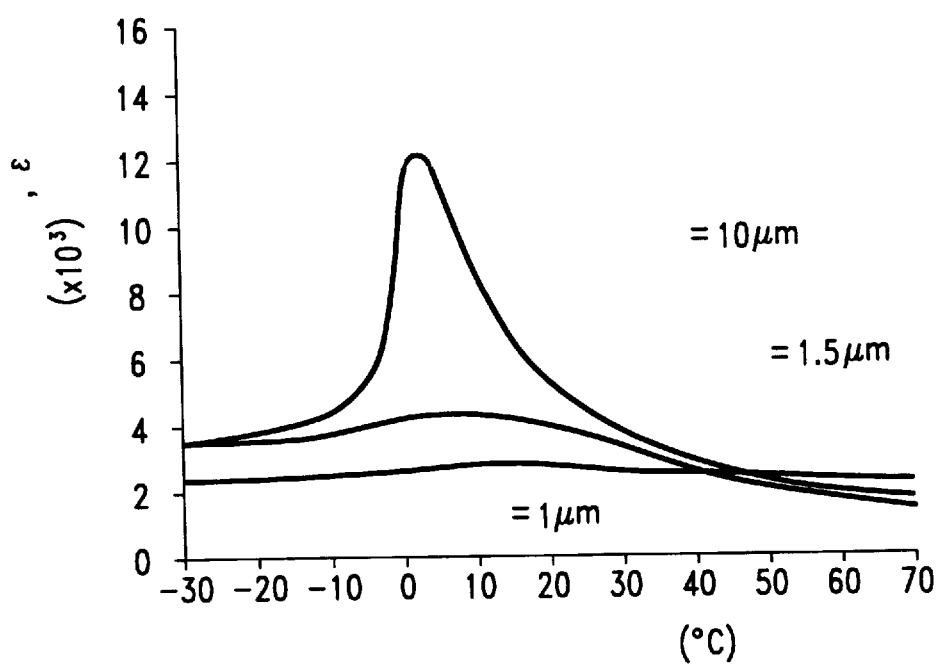
FIG. 3 is a graph showing the variation of dielectric constant versus temperature for undoped barium strontium titanate of various grain sizes.

Referring to FIG. 3, the same trend is illustrated for barium strontium titanate. At a 10 $\mu$m grain size, the dielectric constant varies rapidly with temperature, but at smaller grains sizes the peak is less pronounced.

Generally, when the rate of change of the dielectric constant with temperature is large, the pyroelectric FOM is also large. As these figures show, the rate of change of the dielectric constant decreases below some grain size, i.e. the slope of the curve becomes smaller as the grain size is decreased below some value. That value for barium titanate is approximately 6.8 $\mu$m according to the data represented by FIG. 1. As FIG. 3 illustrates, that value for barium strontium titanate is approximately 10 $\mu$m.

As these figures illustrate, the pyroelectric FOM of pyroelectric perovskite materials decreases rapidly below some grain size. Again, the pyroelectric critical grain size (PCGS), as used herein, means the largest grain size such that the pyroelectric FOM starts to rapidly decrease with decreasing grain sizes. The typical grain size present in most thin-film perovskites is generally much smaller than the PCGS, causing the pyroelectric properties of thin films to be small or nonexistent. The grain size of a thin film perovskite must be larger than the PCGS in order for the film to possess useful pyroelectric properties. A method to decrease the PCGS below typical thin film grain sizes is desirable.

The useful ferroelectric properties of perovskites also decrease for decreasing grain sizes. For example, the remanent polarization exhibited by barium zirconate titanate is 18 $\mu$C/cm$^2$ for grain sizes larger than 100 $\mu$m. For grain sizes in the range of 30 to 50 $\mu$m, the remanent polarization has been measured at 6 $\mu$C/cm$^2$. For still smaller grain sizes (e.g. 1 $\mu$m); the remanent polarization rapidly decreases until it is essentially gone.

As is illustrated by this example, the remanent polarization of ferroelectric perovskite materials decreases rapidly below some grain size. Again, the ferroelectric critical grain size (FCGS), as used herein, means the largest grain size such that the remanent polarization starts to rapidly decrease with decreasing grain sizes. The typical grain size present in most thin-film perovskites is generally much smaller than the FCGS, causing the ferroelectric properties of thin films to be small or nonexistent. The grain size of a thin film perovskite must be larger than the FCGS in order for the film to possess useful ferroelectric properties. A method to decrease the FCGS below typical thin film grain sizes is desirable.

It has been found that donor dopants generally decrease the pyroelectric critical grain size and the ferroelectric critical grain size of perovskite materials. This effect is not taught by the prior art and its mechanism and explanation are uncertain. Generally, an element or ion is a donor dopant if (1) it replaces an atom in the crystal lattice and has a greater number of valence electrons than the atom it replaces or (2) it exists interstitially and its outer electron shell is less than half full. Intermediate cases are uncertain and may be determined empirically. For example, some elements behave as donor dopants in (1) when their valence is the same as the atom replaced. Likewise, in (2) some elements behave as donor dopants when their valence shell is exactly half full.

It has also been found that acceptor dopants increase the resistivity of some perovskite materials. Therefore, another aspect of this invention is acceptor co-doping of ferroelectric and pyroelectric perovskite materials. Generally, an element or ion is an acceptor dopant if (1) it replaces an atom in the crystal lattice and has a lesser number of valence electrons than the atom it replaces or (2) it exists interstitially and its outer electron shell is more than half full. Intermediate cases are uncertain and may be determined empirically. For example, some elements behave as acceptor dopants in (1) when their valence is the same as the atom replaced. Likewise, in (2) some elements behave as acceptor dopants when their valence shell is exactly half full.

A dopant is a species which is intentionally introduced into an intrinsic material in order to produce some effect. Unintentional impurities which exist in concentrations below approximately 0.1 mole percent are not generally considered dopants. Accordingly, in the context of this invention, an intrinsic perovskite material is a perovskite material in which impurities which behave as donor or acceptor dopants, if present, exist at concentrations below approximately 0.1 mole percent. Similarly, an intrinsic pyroelectric critical grain size (IPCGS) is the pyroelectric critical grain size of an intrinsic perovskite material. An intrinsic ferroelectric critical grain size (IFCGS) is the ferroelectric critical grain size of an intrinsic perovskite material.

The nominal compositional formula for the preferred embodiment material is given as $$(Ba_a,Sr_b,Ca_c)_{1-x}D_xTi_{1-y}A_yO_3$$

where D comprises a trivalent donor ion (e.g., Bi, Sb, Y, La, Ce, Pr, Nd, Sm, Gd, Tb, Dy, Ho, and Er or a combination thereof) and A comprises a trivalent acceptor ion (e.g., Co, Cu, Fe, Mn, Ru, Al, Ga, Sc, In, Ni, and Yb or a combination thereof) or a divalent acceptor ion (e.g., Mg). It is noted that both trivalent and divalent acceptor ions reside on the Ti sub-lattice. The values for the compositional ratios are given in Table 1, below.

TABLE 1

| Variable | Minimum | Maximum | Preferred |
|----------|---------|---------|-----------|
| a | 0.55 | 0.75 | 0.6 |
| b | 0.25 | 0.40 | 0.3 |
| c | 0.00 | 0.20 | 0.1 |
| x | 0.003 | 0.030 | .005 to .010 |
| y | 0.000 | 0.010 | .001 to .002 |

Of course, the sum of a, b, and c will be one (i.e., $a+b+c=1$).

The nominal compositional formula for a second preferred embodiment material is given as $$(Ba_a,Sr_b,Ca_c)Ti_{1-x-y}D_xA_yO_3$$

where D comprises a pentavalent donor ion (e.g., Nb, Ta or a combination thereof) and A comprises a trivalent or divalent acceptor ion (e.g., Co, Cu, Fe, Mn, Ru, Al, Ga, Mg, Sc, In, Ni, and Yb or a combination thereof). The values for the compositional ratios given in Table 1 still apply.

The nominal compositional formula for a third preferred embodiment material is given as $$(Ba_a,Sr_b,Ca_c)_{1-x-y}D_xA_yTiO_3$$

where D comprises a trivalent donor ion (e.g., Bi, Sb, Y, La, Ce, Pr, Nd, Sm, Gd, Tb, Dy, Ho, and Er or a combination thereof) and A comprises a univalent acceptor ion (e.g., K, Na or a combination thereof). Once again, the values for the compositional ratios given in Table 1 apply.

The nominal compositional formula for a fourth preferred embodiment material is given as $$(Ba_b,Sr_b,Ca_c)_{1-y}A_yTi_{1-x}D_xO_3$$

where D comprises a pentavalent donor ion (e.g., Nb, Ta, or a combination thereof) and A comprises a univalent acceptor ion (e.g., K, Na or a combination thereof). Yet once again, the values for the compositional ratios given in Table 1 apply.

It is noted that the preceding formulas for the four listed embodiments do not comprehend a balance of electrical charge if x and y are not equal. Since x and y are generally different (usually x>y), charge compensation must occur by formation of ionic vacancies on the Ba and/or the Ti sub-lattice(s). For the first embodiment example (i.e., trivalent donors on the Ba-site and trivalent acceptors on the Ti-site), assuming that x>y and compensation occurs on the Ba sub-lattice, the formula taking into account charge compensation would be:

$$[(Ba_a,Sr_b,Ca_c)_{1-x}D_xV_{(x-y)/2}][Ti_{1-y}A_y]O_3$$

since the difference in ionic charge substitution is (x−y) and one barium vacancy (V) can compensate a charge difference of 2 (Ba has a valence of 2). If the compensation occurred on the Ti site, (x−y)/4 vacancies would be required. In the present invention, it is typically desired that x>y, otherwise compensation could occur on the oxygen sub-lattice.

It can be seen that including the charge compensation leads to a plethora of different formulas, depending on the assumptions. It is therefore assumed that the nominal formulas given for the first four preferred embodiments encompass the variations which can be achieved to obtain charge compensation as described herein.

In an experiment, material with the nominal composition $$(Ba_{0.66},Sr_{0.34},Dy_{0.01}Ti_{1.009}Mn_{0.001}O_{3.03}$$

was prepared. The material was made by combining constituents in a solution, then the solution was calcined in bulk, ground, pressed, then sintered. The resulting ceramic density was at least 95% of theoretical density. The ceramic material was then mechanically polished and thinned to 250 $\mu$m thickness. Metallization was applied to form test capacitors.

The average grain size of this material was 0.5 $\mu$m as measured by the line intercept method. The peak dielectric constant (the dielectric constant at the Curie temperature) was greater than 10,000, and varied rapidly with respect to temperature (i.e. this material exhibited good pyroelectric properties). This behavior indicates that the pyroelectric critical grain size of this material is less than 0.5 μm.

A few preferred embodiments have been described in detail hereinabove. It is to be understood that the scope of the invention also comprehends embodiments different from those described, yet within the scope of the claims. For example, many perovskite materials also exhibit piezoelectric properties which make them useful in miniature mechanical devices, sensors, and standing acoustic wave (SAW) devices. The effects and advantages of donor doping of these materials apply equally well to piezoelectric applications.

Internal and external connections can be ohmic, capacitive, direct or indirect, via intervening circuits or otherwise. Implementation is contemplated in discrete components or fully integrated circuits in silicon, gallium arsenide, or other electronic materials families, as well as in optical-based or other technology-based forms and embodiments.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A ferroelectric structure formed on the surface of a substrate, said structure comprising a ferroelectric thin film of a donor doped perovskite material having a composition $(A_{1-x}D_y)BO_3$ wherein A comprises one or more divalent elements, B comprises one or more tetravalent elements, D comprises one or more donor ions selected from the group consisting of Bi, Sb, Y, La, Ce, Pr, Nd, Sm, Gd, Tb, Dy, Ho and Er, $x \leq 0.1$, and $y \leq 0.1$, said donor doped perovskite material having an average grain size less than or equal to 0.5 μM.

2. The structure of claim 1, wherein said average grain size is less than 0.5 μm.

3. The structure of claim 1, wherein A is selected from the group consisting of barium, strontium and combinations thereof, and wherein B comprises titanium.

4. The structure of claim 1, wherein said donor doped perovskite material is further doped with one or more acceptor dopants, whereby the resistivity of said thin film is substantially increased.

5. The structure of claim 4, wherein said donor doped perovskite material comprises $(Ba_a,Sr_b,Ca_c)_{1-x}D_xTi_{1-y}A'_yO_3$ wherein $a+b+c=1$, $0.55 \leq a \leq 0.75$, $0.25 \leq b \leq 0.4$, $0.0 \leq c \leq 0.2$, $0.003 \leq x \leq 0.03$, $0.0 \leq y \leq 0.01$ and A' comprises one or more trivalent acceptor ions.

6. A ferroelectric structure formed on the surface of a substrate, said structure comprising a first conductive layer; and a ferroelectric thin film of a donor doped perovskite material having a film thickness of less than 0.5 μm and having a composition $(A_{1-x}D_y)BO_3$ wherein A comprises one or more divalent elements, B comprises one or more tetravalent elements, D comprises one or more donor ions selected from the group consisting of Bi, Sb, Y, La, Ce, Pr, Nd, Sm, Gd, Tb, Dy, Ho and Er, $x \leq 0.1$, and $y \leq 0.1$, said thin film of donor doped perovskite material in contact with said first conductive layer.

7. The structure of claim 6, wherein said thin film of donor doped perovskite material is interposed between said first conductive layer and a second conductive layer.

8. The structure of claim 7, wherein said donor doped perovskite material is further doped with one or more acceptor dopants, whereby the resistivity of said thin film is substantially increased.

9. The structure of claim 7, said structure forming a thin film capacitor for storing electrical charge in a random access memory device.

* * * * *